Aug. 14, 1951   R. E. KRUCK   2,563,943
DISPENSING DEVICE
Filed Sept. 13, 1948
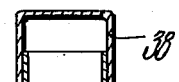
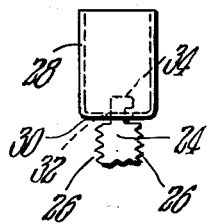
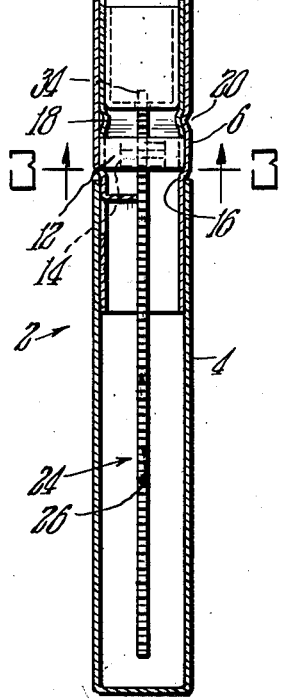
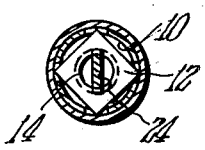
INVENTOR.
Ralph E. Kruck.
BY Ross & Ross
Attys Patented Aug. 14, 1951

2,563,943

UNITED STATES PATENT OFFICE 2,563,943

DISPENSING DEVICE

Ralph E. Kruck, Blaisdell Point, Conn.

Application September 13, 1948, Serial No. 49,040

3 Claims. (Cl. 206—56)

My invention relates to improvements in dispensing applicating devices and is directed more particularly to improvements in a device for dispensing and applying lip rouge and the like.

The principal objects of the invention are directed to the provision of a device which is easily and readily manipulated for dispensing and applying lip rouge although the novel features thereof are adapted for other and various uses.

According to special features of the invention the device includes components which are simple in form so as to be economically manufactured while they are easily and readily assembled without the necessity of special tools and machinery all to the end that the device may be produced at low cost to meet the demand for low cost devices of this kind.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Fig. 1 is a longitudinal sectional view through a dispensing applicator device embodying the novel features of the invention.

Fig. 2 is a side elevational view of the cup or pusher member of the device with the propeller member connected thereto; and Fig. 3 is a sectional view on the line 3—3 of Fig. 1.

Referring now to the drawings more in detail, the invention will be fully described.

A lower tubular barrel member 2 is provided which may include members 4 and 6 which are readily and easily assembled and when so assembled are relatively non-rotatable. They may be frictionally engaged or otherwise held against relative movements. A tubular chamber member 10 for rouge material or the like is provided the lower end of which is rotatable in the barrel structure.

A nut 12 is provided which has a threaded hole 14. The lower end of the member 10 is provided with upwardly extending slots or notches the sides of which engage the sides of the nut 12 whereby said nut and member 10 are relatively non-rotatable.

The member 6 is reduced in diameter at 16 to provide a shoulder below the nut 12, as shown in Fig. 1. The member 10 is provided with an outer annular groove 18 and the member 6 is provided with an inwardly extending projection 20 disposed in said groove whereby said members 6 and 10 are relatively rotatable without danger of accidental axial separation.

The parts thus far are readily and easily assembled by dropping the nut into member 6 and inserting member 10 into the barrel member.

A propeller 24 is provided which is preferably in the form of a ribbon-like strip having threaded opposite edges 26 so as to threadedly engage the hole 14 in the nut 12.

A pusher 28 preferably in the form of a cup has a lower wall 30 provided with an opening 32. The propeller has a hook 34 on its upper end so formed that it may be passed through the opening 32 of the pusher so that said propeller and pusher are hooked together, as shown in Fig. 2.

The barrel member is provided with means to prevent rotation of the propeller and may consist of a key 36 in the form of a tongue struck from the side wall of the barrel structure and extending inwardly to engage a side of the propeller.

A cap 38 is provided which is receivable on the chamber member, as shown.

As the components are assembled, as in Fig. 1, the construction is such that the barrel and chamber members may be relatively rotated in opposite directions to bring about up and down movements of the propeller and pusher.

With rouge material in the chamber member it may be urged upwardly by relative rotation of the barrel and chamber members to be dispensed and applied.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A device for dispensing cosmetic material comprising in combination, a barrel including a lower tubular member and an upper tubular member having a lower end portion in and secured to the upper end of the lower member and extending upwardly therefrom and provided with an internal outwardly and radially extending shoulder adjacent the upper end of said lower member, an internally threaded nut member in the said upper tubular member resting on said shoulder, a tubular chamber having a lower end in said upper tubular member, relatively non-rotatable connections between said chamber and nut member, said chamber and upper member provided with an annular groove and projection therein holding said chamber and upper member against axial separation, a screw member in operative engagement with said nut member, a pusher reciprocable in said chamber operatively connected to the upper end of said screw member, and means holding said screw and barrel against relative rotation.

2. A device for dispensing cosmetic material comprising in combination, a barrel including a lower tubular member and an upper tubular member having a lower end portion in and secured to the upper end of the lower member and extending upwardly therefrom and provided with an internal outwardly and radially extending shoulder adjacent the upper end of said lower member, an internally threaded nut member in the said upper tubular member resting on said shoulder, a tubular chamber having a lower end in said upper tubular member, relatively non-rotatable connections between said chamber and nut member, said chamber and upper member provided with an annular groove and projections therein holding said chamber and upper member against axial separation, a screw member in operative engagement with said nut member, a pusher reciprocable in said chamber operatively connected to the upper end of said screw member, and means holding said screw and barrel against relative rotation, said non-rotatable connections including slots provided on said chamber in which projections provided on said nut member are disposed.

3. A device for dispensing cosmetic material comprising in combination, a barrel including a lower tubular member and an upper tubular member having a lower end portion in and secured to the upper end of the lower member and extending upwardly therefrom and provided with an internal outwardly and radially extending shoulder adjacent the upper end of said lower member, an internally threaded nut member in the said upper tubular member resting on said shoulder, a tubular chamber having a lower end in said upper tubular member, relatively non-rotatable connections between said chamber and nut member, said chamber and upper member provided with an annular groove and projection therein holding said chamber and upper member against axial separation, a screw member in operative engagement with said nut member, a pusher reciprocable in said chamber operatively connected to the upper end of said screw member, and means holding said screw and barrel against relative rotation, said holding means including a member extending from said chamber into engagement with said screw member.

RALPH E. KRUCK.

REFERENCES CITED

The following references are of record in the file of this patent:

UNITED STATES PATENTS

| Number | Name | Date |
| --- | --- | --- |
| 1,357,980 | Hawkins | Nov. 9, 1920 |
| 1,396,535 | Shimer | Nov. 8, 1921 |
| 2,210,432 | Roesch | Aug. 6, 1940 |
| 2,274,311 | Wehn | Feb. 24, 1942 |
| 2,356,474 | Savoie | Aug. 22, 1944 |
| 2,398,161 | Skold | Apr. 9, 1946 |